United States Patent [19]

Noda et al.

[11] Patent Number: 4,833,553
[45] Date of Patent: May 23, 1989

[54] MAGNETIC DISC CARTRIDGE LOADING AND UNLOADING MECHANISM

[75] Inventors: Yasushi Noda, Tokyo; Takashi Ashida, Kawaguchi; Kazuhiko Inoue; Kazuo Yokota, both of Tokyo, all of Japan

[73] Assignee: Teac Corporation, Tokyo, Japan

[21] Appl. No.: 73,985

[22] Filed: Jul. 16, 1987

[30] Foreign Application Priority Data

Jul. 17, 1986 [JP] Japan .............................. 61-109600[U]
Jul. 17, 1986 [JP] Japan .............................. 61-109599[U]

[51] Int. Cl.$^4$ .......................................... G11B 17/032
[52] U.S. Cl. .................................................. 360/99.06
[58] Field of Search ...................................... 360/97–99, 360/133, 96.5, 96.6

[56] References Cited

U.S. PATENT DOCUMENTS

| 4,685,010 | 8/1987 | Tronzano | 360/97 |
| 4,686,594 | 8/1987 | Kurafuji | 360/99 |
| 4,688,123 | 8/1987 | Sokol et al. | 360/97 |
| 4,737,871 | 4/1988 | Saito | 360/99 |
| 4,750,063 | 6/1988 | Kume et al. | 360/99 |

FOREIGN PATENT DOCUMENTS

| 144068 | 6/1985 | European Pat. Off. | 360/97 |
| 60-243850 | 12/1985 | Japan | 360/97 |
| 61-9867 | 1/1986 | Japan | 360/97 |

Primary Examiner—John H. Wolff
Assistant Examiner—Matthew J. Bussan
Attorney, Agent, or Firm—Michael N. Meller

[57] ABSTRACT

A magnetic disc cartridge loading and unloading mechanism comprises a shutter opening mechanism which applies no pushing force on a magnetic disc cartridge in a cartridge ejecting direction when the shutter opening mechanism is in an operating state where a shutter of the magnetic disc cartridge is opened. The magnetic disc cartridge loading and unloading mechanism is also provided with a pushing mechanism which pushes the magnetic disc cartridge slightly in the cartridge ejecting direction after sufficient gaps are formed between the shutter and magnetic heads when a holder which holds the magnetic disc cartridge rises to a predetermined height position during a cartridge unloading operation.

7 Claims, 10 Drawing Sheets

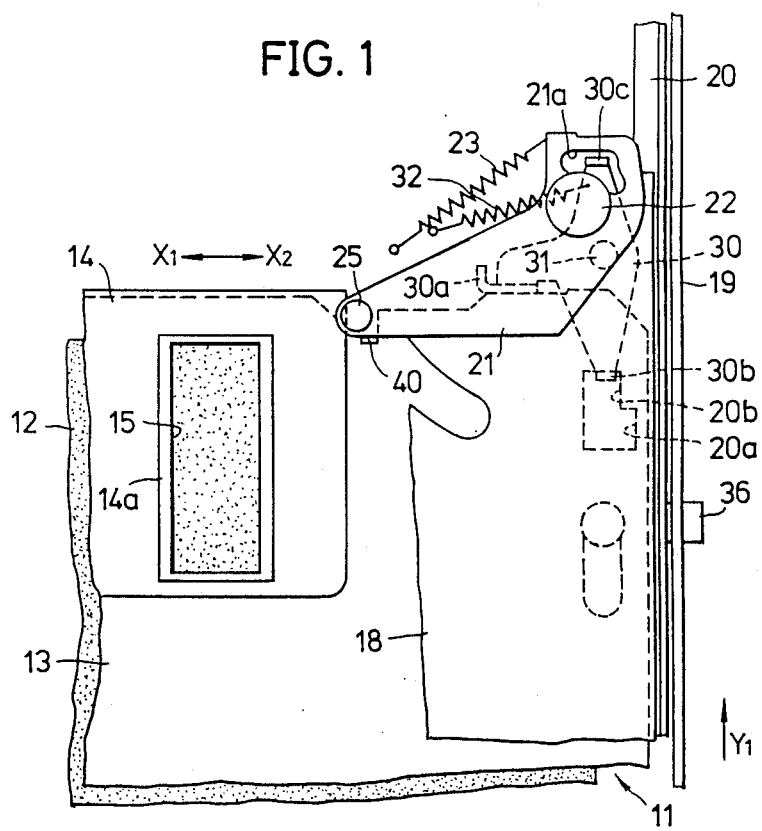
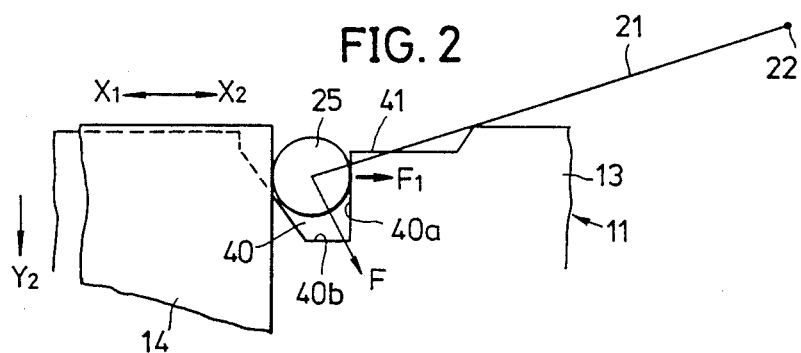

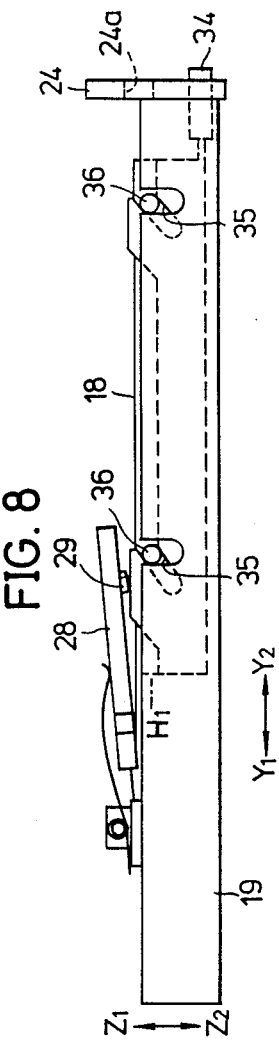
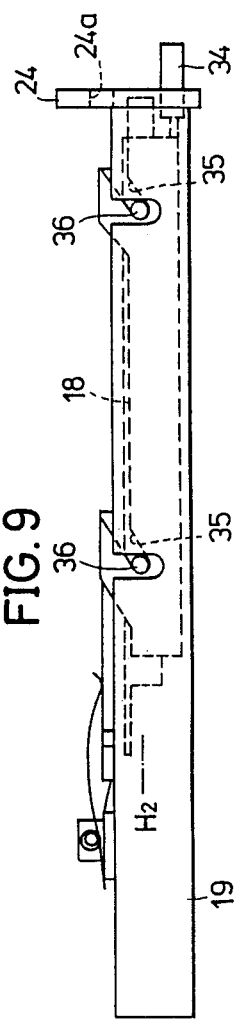
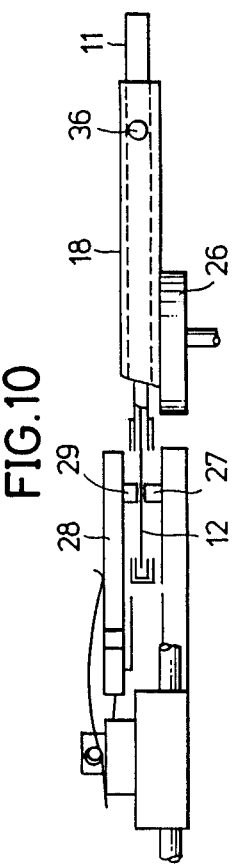

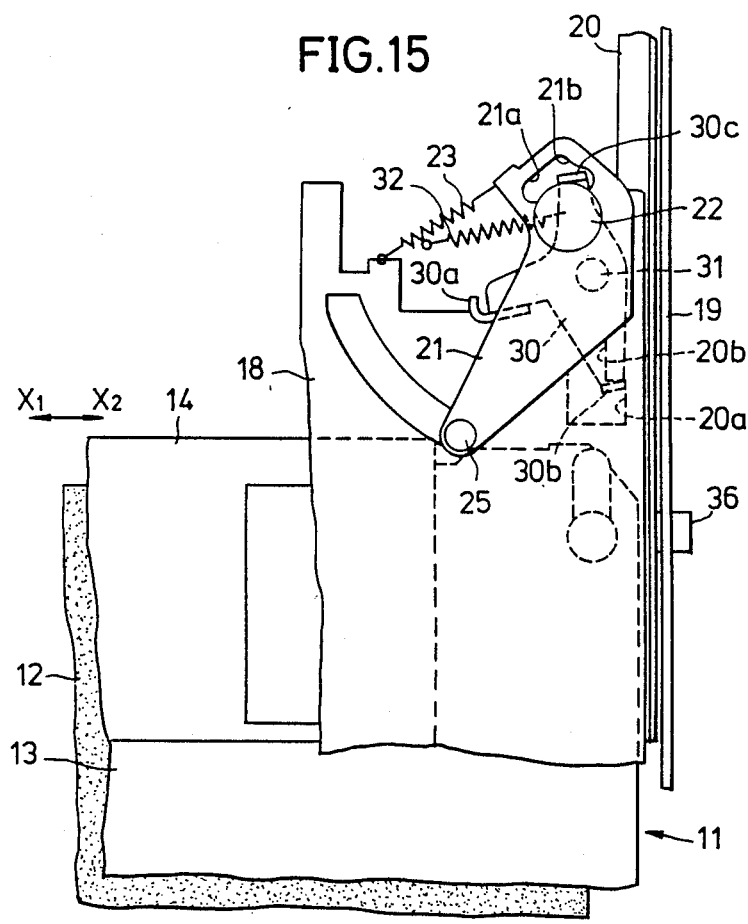

MAGNETIC DISC CARTRIDGE LOADING AND UNLOADING MECHANISM

BACKGROUND OF THE INVENTION

The present invention generally relates to magnetic disc cartridge loading and unloading mechanisms, and more particularly to a magnetic disc cartridge loading and unloading mechanism for a magnetic disc recording and/or reproducing apparatus which carries out a recording and/or a reproduction of a signal with respect to a magnetic disc accommodated within a magnetic disc cartridge which is provided with a shutter.

Generally, a magnetic disc cartridge (hereinafter simply referred to as a cartridge) is inserted horizontally into a holder of a magnetic disc cartridge loading and unloading mechanism, through a cartridge inserting opening in a front panel of a magnetic disc recording and/or reproducing apparatus. The cartridge is lowered together with the holder to a loaded position within the recording and/or reproducing apparatus. When unloading the cartridge, the holder is raised together with the cartridge, and the cartridge is ejected out of the holder through the cartridge inserting opening in the front panel.

The recording and/or reproducing apparatus is provided with a shutter opening mechanism, and a shutter of the cartridge is opened by the shutter opening mechanism as the cartridge is inserted into the holder. The shutter is normally closed to cover windows in the cartridge. The shutter opening mechanism also has the function of ejecting (that is, pushing) the cartridge out of the holder. However, in the conventional loading and unloading mechanism, the shutter opening mechanism is designed to apply a pushing force on the cartridge in a cartridge ejecting direction even when the cartridge is inserted to a final position within the holder and the shutter is opened, when the cartridge is in the loaded position in the recording and/or reproducing apparatus, and also when the holder is rising during an initial stage of a cartridge unloading operation.

For this reason, during an initial stage of a cartridge loading operation, the user must hold a rear end of the cartridge which is being inserted into the holder by his finger tips so that the cartridge will not be pushed out by the pushing force exerted by the shutter opening mechanism. In other words, there is a problem in that the cartridge may be pushed out of the holder and may not be inserted properly into the holder if the holding force on the rear end of the cartridge is insufficient.

In addition, it is undesirable from the point of view of maintaining a high cartridge positioning accuracy when the cartridge in the loaded position is pushed in the cartridge ejecting direction.

Furthermore, the movement of the cartridge in the cartridge ejecting direction is restricted by a back surface of the front panel which contacts the rear end of the cartridge, for example.

Therefore, even during the initial stage of the cartridge unloading operation when the cartridge is raised together with the holder, the cartridge is constantly applied with the pushing force acting in the cartridge ejecting direction, and thus, the ejection of the cartridge is started immediately when the cartridge rises to a position confronting the cartridge inserting opening in the front panel. Accordingly, the height position of the cartridge which is ejected is determined by the position of the cartridge inserting opening in the front panel.

The mounting position of the front panel on the recording and/or reproducing apparatus is slightly inconsistent among the recording and/or reproducing apparatuses due to inevitable mounting error. Hence, when the front panel is mounted at a height position lower than a regular height position, the cartridge is ejected before magnetic heads of the recording and/or reproducing apparatus completely move out of the way from a state where the magnetic heads are in contact with a magnetic disc accommodated within the cartridge through the windows in the cartridge. As a result, the closing shutter may hit and scratch head surfaces of the magnetic heads, and there is a problem in that the magnetic heads are easily damaged due to the inevitable mounting error of the front panel on the recording and/or reproducing apparatus.

SUMMARY OF THE INVENTION

Accordingly, it is a general object of the present invention to provide a novel and useful magnetic disc cartridge loading and unloading mechanism in which the problems described heretofore are eliminated.

Another and more specific object of the present invention is to provide a magnetic disc cartridge loading and unloading mechanism in which a shutter opening mechanism applies no pushing force on a magnetic disc cartridge in a cartridge ejecting direction when the shutter opening mechanism is in an operating state where a shutter of the magnetic disc cartridge is opened, and the magnetic disc cartridge loading and unloading mechanism is provided with a pushing mechanism which pushes the magnetic disc cartridge slightly in the cartridge ejecting direction after sufficient gaps are formed between the shutter and magnetic heads when a holder which holds the magnetic disc cartridge rises to a predetermined height position during a cartridge unloading operation. According to the magnetic disc cartridge loading and unloading mechanism of the present invention, the shutter opening mechanism enables a stable loading of the magnetic disc cartridge. The magnetic heads are positively protected from being damaged by the closing shutter, because the shutter opening mechanism and the pushing mechanism limit the closing of the shutter until the sufficient gaps are formed between the shutter and the magnetic heads and permits the closing of the shutter only after the sufficient gaps are formed.

Still another object of the present invention is to provide a magnetic disc cartridge loading and unloading mechanism further provided with a lock mechanism for locking the shutter opening mechanism in the operating state where the shutter is opened until the holder rises to the predetermined height position and the sufficient gaps are formed between the shutter and the magnetic heads, and for cancelling the lock after the sufficient gaps are formed. According to the magnetic disc cartridge loading and unloading mechanism of the present invention, the magnetic heads are positively prevented from being damaged by the closing shutter, because the lock mechanism limits the closing of the shutter until the sufficient gaps are formed and permits the closing of the shutter only after the sufficient gaps are formed.

Other objects and further features of the present invention will be apparent from the following detailed description when read in conjunction with the accompanying drawings.

BRIEF DESCRIPTION OF THE DRAWINGS

FIG. 1 is a plan view showing an essential part of a first embodiment of the magnetic disc cartridge loading and unloading mechanism according to the present invention on an enlarged scale in a state where a magnetic disc cartridge is loaded;

FIG. 2 is a diagram for explaining a direction of a force acting on the magnetic disc cartridge;

FIGS. 7 and 8 are a plan view and a side view respectively showing the first embodiment in a state before the loading of the magnetic disc cartridge;

FIG. 9 is side view showing the first embodiment in a state where the magnetic disc cartridge is loaded;

FIG. 10 is a side view of the first embodiment shown in FIG. 9 with a part cut away;

FIG. 15 is a plan view showing the second embodiment in an initial stage of the ejection of the magnetic disc cartridge.

DETAILED DESCRIPTION

Figure 3:
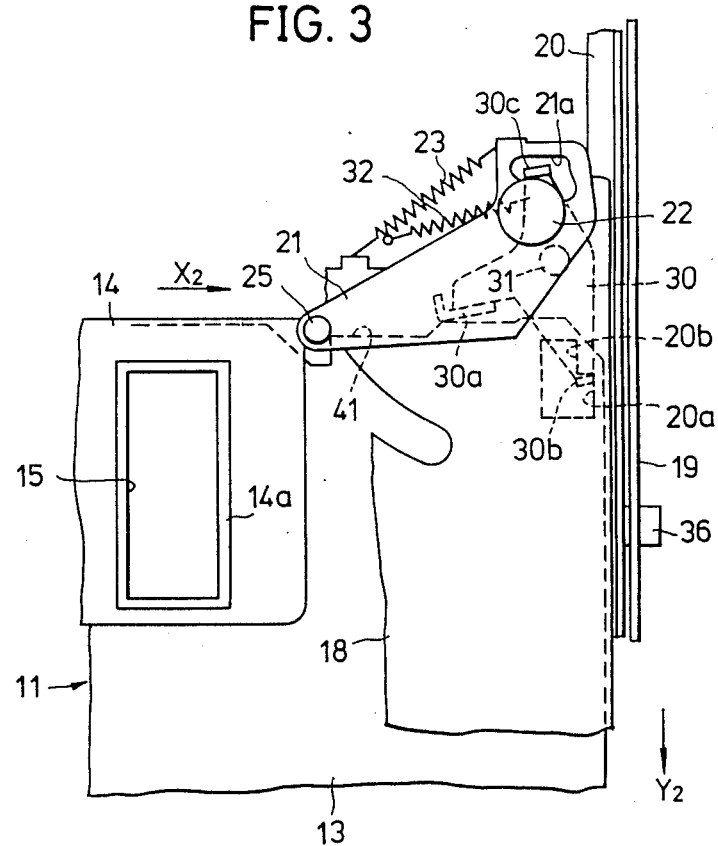
FIG. 3 is a plan view showing the first embodiment in an initial stage of the ejection of the magnetic disc cartridge when a pushing mechanism operates.
Figure 4:
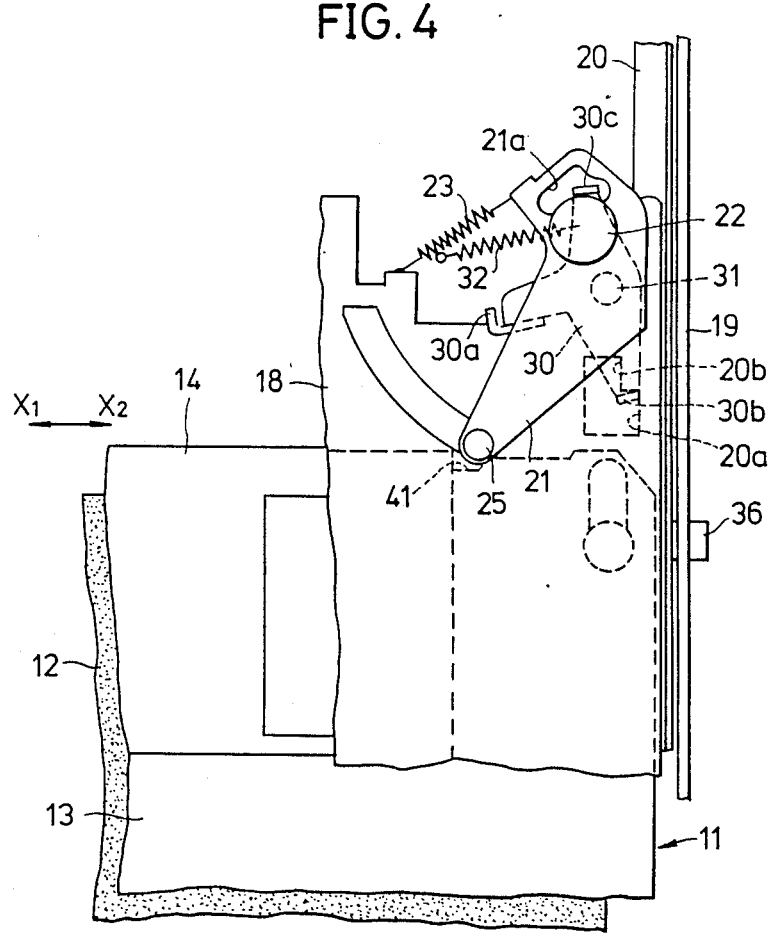
FIG. 4 is a plan view showing the first embodiment in a state where a shutter opening mechanism is returned to an original state.

FIG. 1 shows an essential part of a first embodiment of the magnetic disc cartridge loading and unloading mechanism according to the present invention on an enlarged scale in a state where a magnetic disc cartridge is loaded, and FIG. 2 shows a force acting on the magnetic disc cartridge in the state shown in FIG. 1. FIGS. 3 and 4 respectively show the first embodiment in an initial state of the ejection of the magnetic disc cartridge, where FIG. 3 shows a pushing mechanism in an operating state and FIG. 4 shows a shutter opening mechanism returned to an original state.

Figure 5:
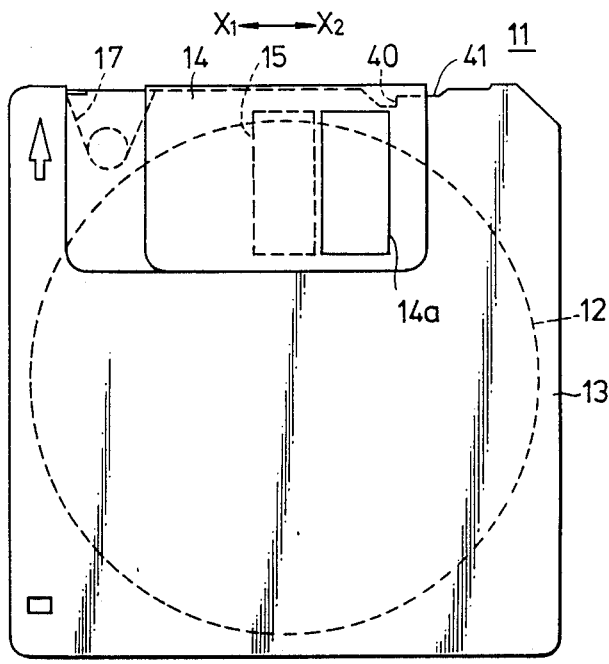
FIGS. 5 and 6 are a plan view and a bottom view respectively showing a magnetic disc cartridge used in the magnetic disc cartridge loading and unloading mechanism according to the present invention.
Figure 6:
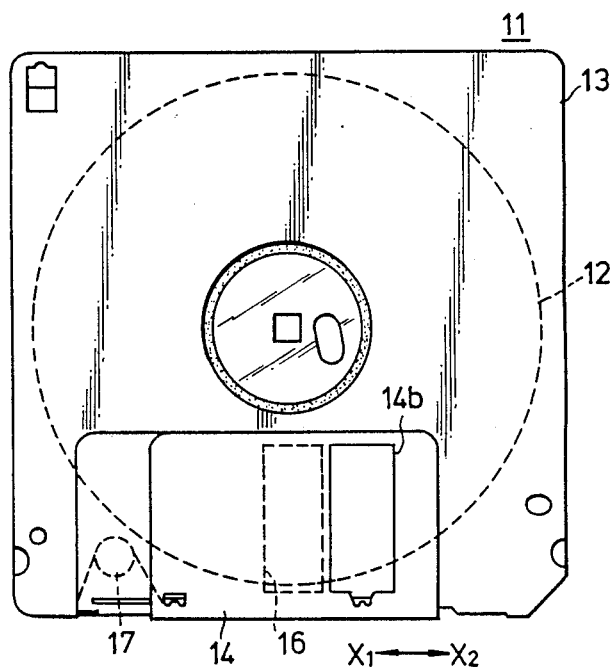

As shown in FIGS. 5 and 6, a magnetic disc cartridge (hereinafter simply referred to as a cartridge) 11 comprises a cartridge body 13 having a generally flat parallelepiped shape, a magnetic disc 12 accommodated within the cartridge body 13, and a shutter 14 slidably provided on a front end of the cartridge body 13. The shutter 14 is slidable in directions $X_1$ and $X_2$, and is normally closed by a force of a spring 17 acting in the direction $X_2$ so as to cover windows 15 and 16 formed in the cartridge body 13 near the front end thereof. When the shutter 14 moves in the direction $X_1$ and opens, the windows 15 and 16 open through corresponding openings 14a and 14b in the shutter 14, and the magnetic disc 12 becomes exposed through the windows 15 and 16.

Next, a general description will be given on the loading and unloading of the cartridge 11 into and from a magnetic disc recording and/or reproducing apparatus applied with the first embodiment.

Figure 7:
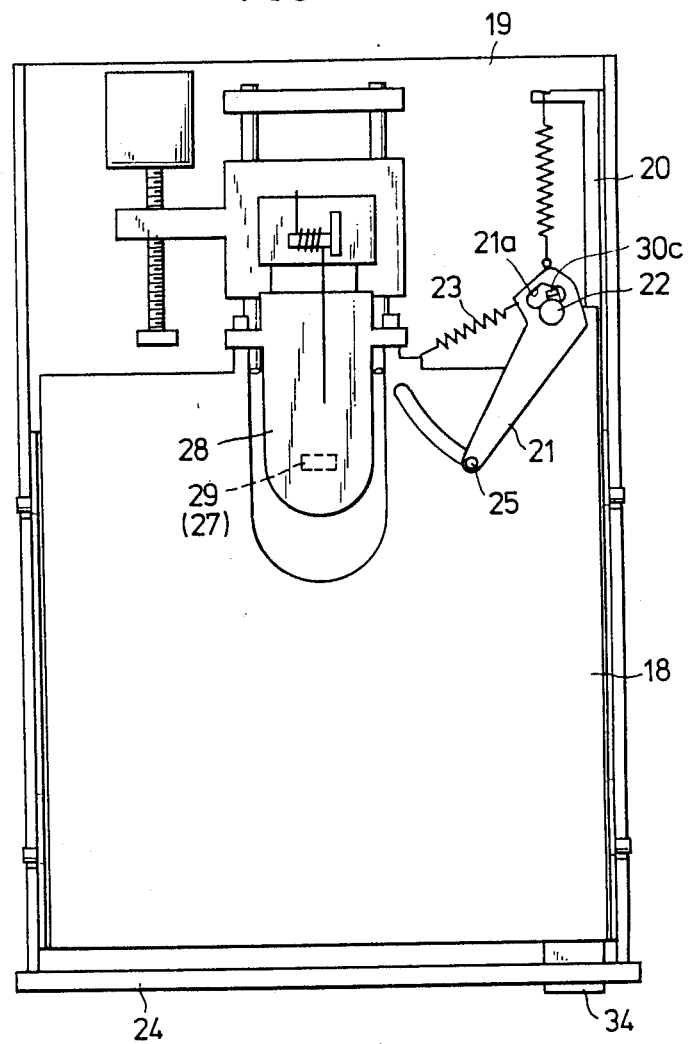
Figure 11:
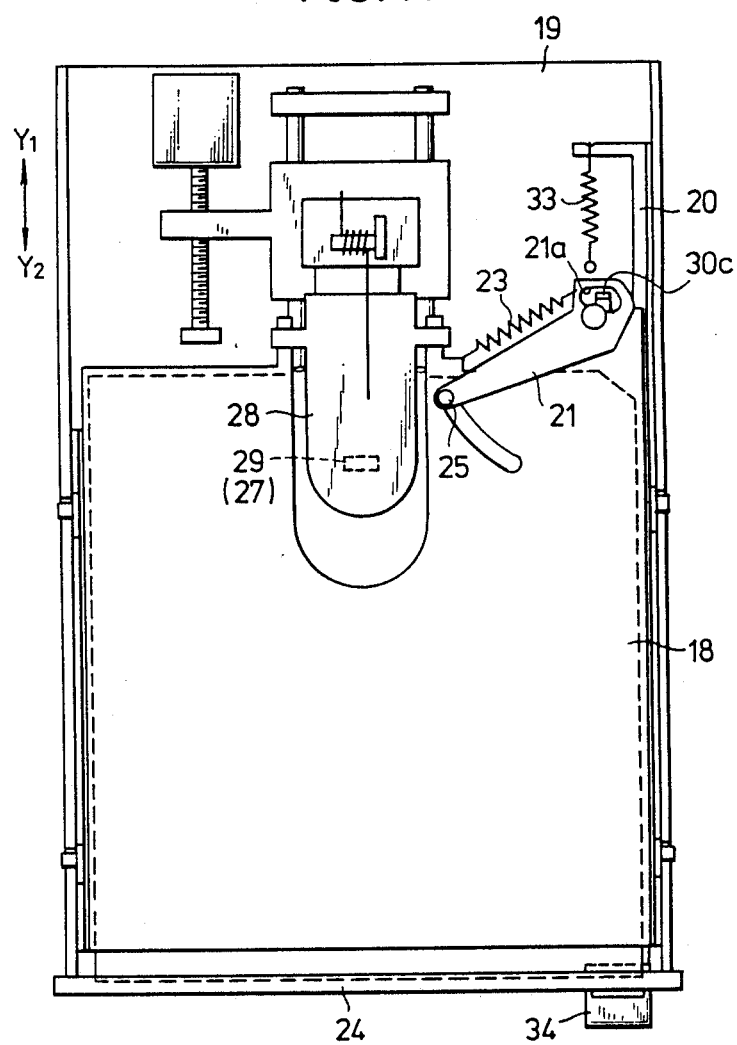
FIG. 11 is a plan view of the first embodiment shown in FIG. 9.

Before the loading of the cartridge 11, the recording and/or reproducing apparatus is in a state shown in FIGS. 7 and 8. A holder 18 is at a raised position (inserting/ejecting position) $H_1$, and a slider 20 which constitutes a holder moving mechanism is at a position moved along a direction $Y_1$ on a chassis 19. A shutter lever 21 which constitutes a shutter opening mechanism is at a position rotated counterclockwise. As shown in FIG. 1, the shutter lever 21 is rotatably supported on a pin 22 on the holder 18 and is urged counterclockwise by a spring 23.

The cartridge 11 is inserted in the direction $Y_1$ from the front end thereof provided with the shutter 14. The inserted cartridge 11 is passed through a cartridge inserting opening 24a in a front panel 24 of the recording and/or reproducing apparatus, and is inserted into and held within the holder 18.

In a stage where the cartridge 11 is inserted in the direction $Y_1$ beyond the position shown in FIG. 4, the shutter lever 21 is pushed by the front end of the cartridge 11 and is rotated clockwise. By this clockwise rotation of the shutter lever 21, a pin 25 located on a tip end of the shutter lever 21 pushes the shutter 14. As a result, the shutter 14 moves in the direction $X_1$ and opens so as to open the windows 15 and 16 through the corresponding openings 14a and 14b in the shutter 14.

In this state, the holder 18 is lowered in a direction $Z_2$ together with the cartridge 11 down to a lowered position (loaded position) $H_2$ as shown in FIG. 9, and the cartridge 11 is loaded into the recording and/or reproducing apparatus as best shown in FIGS. 9 through 12. In the loaded position, the magnetic disc 12 of the cartridge 11 is placed on a turntable 26 and a lower magnetic head 27 makes contact with a lower surface of the magnetic disc 12 through the window 15. A head arm 28 pivots and an upper magnetic head 29 on the head arm 28 makes contact with an upper surface of the magnetic disc 12 through the window 15. The magnetic disc 12 is rotated by a motor (not shown), and the magnetic heads 27 and 28 carry out the recording and/or reproduction of signals on and/or from the magnetic disc 12 by moving in the directions $Y_1$ and $Y_2$.

In FIGS. 1, 3, 4 and 12, a lever which constitutes a pushing mechanism is rotatably supported on a pin 31 on the chassis 19. In a final stage of the insertion of the cartridge 11 into the holder 18, the front end of the cartridge 11 pushes a first bent portion 30a of the lever 30 and rotates the lever 30 clockwise against the force exerted by a spring 32. Thus, a second bent portion 30b of the lever 30 escapes from a hole 20a in the slider 20, and the slider 20 slides in the direction $Y_2$ by the action of a spring 33.

An eject button 34 is pushed when unloading the cartridge 11 from the recording and/or reproducing apparatus. When the eject button 34 is pushed, the slider 20 slides in the direction $Y_1$ and the holder 18 rises in a direction $Z_1$. The cartridge 11 is pushed by the lever 30 and the shutter lever 21 and is ejected out of the holder 18.

Next, a description will be given on an essential part of the first embodiment by referring especially to FIGS. 1 through 6 and 13.

When the cartridge 11 is inserted in the direction $Y_1$ to the innermost part of the holder 18, the pin 25 engages within a cutout 40 formed at a front end of the cartridge body 13 as shown in FIGS. 1 and 2. The pin 25 is in contact with a side surface 40a of the cutout 40 extending along the cartridge inserting direction $Y_1$, but is separated from a bottom surface 40b of the cutout 40. Accordingly, a force F of the spring 23 acting on the pin 25 acts on the cartridge 11 as a force $F_1$ in the direction $X_2$, as shown in FIG. 2. In other words, no force acts on the cartridge 11 in the cartridge ejecting direction $Y_2$. In addition, the movement of the cartridge 11 in the direction $X_1$ is restricted by the holder 18.

Therefore, the cartridge 11 is held within the holder 18 in a state where no force acts on the cartridge 11 in the cartridge ejecting direction $Y_2$. The pin 25 engaged within the cutout 40 pushes the side surface 40a of the cutout 40, and the shutter lever 21 is temporarily locked at this rotary position. In this state, the shutter 14 is open. The shutter 14 pushes the pin 25 in the direction $X_2$, and this pushing force also acts on the shutter lever 21 so as to hold the shutter lever 21 at this rotary position.

When the cartridge 11 is inserted into the innermost part of the holder 18 and the shutter 14 is opened, there is no force acting on the cartridge 11 so as to push the cartridge 11 out of the holder 18. For this reason, the cartridge 11 will not be pushed out of the holder 18 even when the user removes his finger tips from a rear end of the cartridge 11, and the cartridge 11 is lowered to the loaded position together with the holder 18. The cartridge loading operation is simple in that the user does not need to keep holding the rear end of the cartridge 11 until the cartridge 11 starts to move down together with the holder 18 as in the case of the conventional mechanism.

In addition, no force acts in the cartridge ejecting direction $Y_2$ on the cartridge 11 in the loaded position. For this reason, it is possible to maintain a high cartridge positioning accuracy when the cartridge 11 is in the loaded position.

Furthermore, when the holder 18 rises in an initial stage of the cartridge unloading operation, no force acts on the cartridge 11 in the cartridge ejecting direction $Y_2$. Hence, in the case where the cartridge inserting opening 24a in the front panel 24 is located at a height position below a regular height position due to mounting error of the front panel 24 the ejection of the cartridge 11 from the holder 18 is not started immediately when the cartridge 11 confronts the cartridge inserting opening 24a.

Next, a description will be given on the pushing mechanism which pushes the cartridge 11 out of the holder 18 during a final stage of the cartridge unloading operation.

Figure 12:
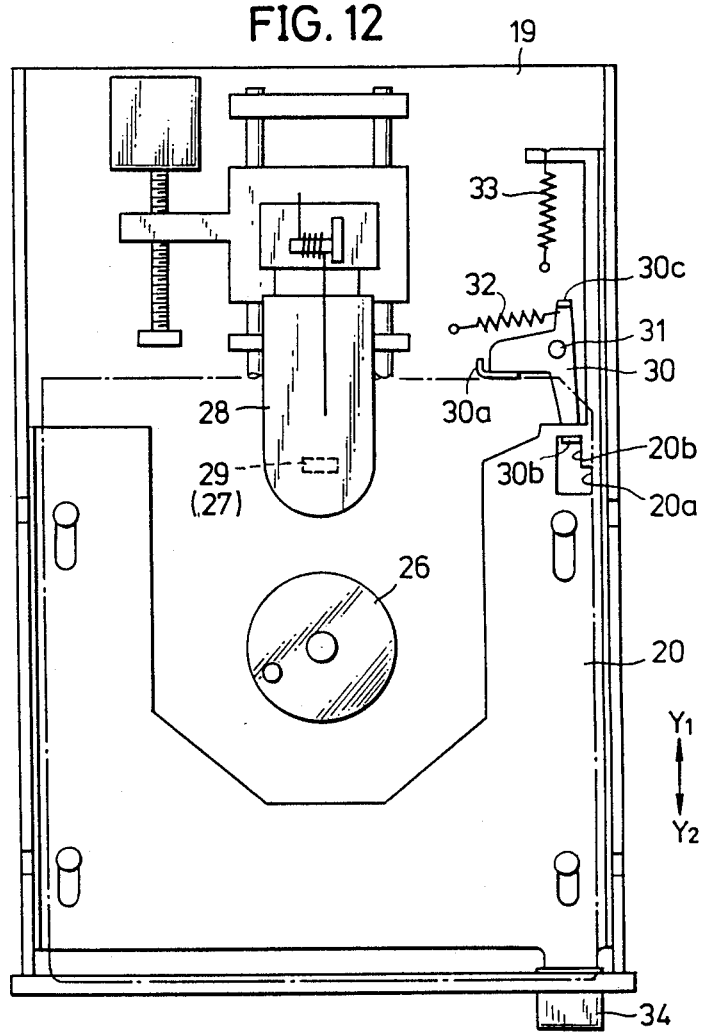
FIG. 12 is a plan view of the first embodiment shown in FIG. 11 with a part cut away.

In the state where the cartridge 11 is in the loaded position as shown in FIG. 12, the second bent portion 30b of the lever 30 is engaged by an edge 20b of the hole 20a in the slider 20. As a result, the counterclockwise rotation of the lever 30 caused by the action of the spring 32 is restricted in this state.

Figure 13:
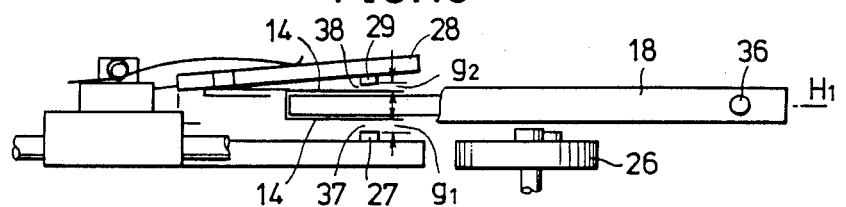
FIG. 13 is a side view showing the first embodiment in a state where gaps are formed between a shutter of the magnetic disc cartridge and magnetic heads.

When the slider 20 slides in the direction $Y_1$, sloping grooves 35 of the slider 20 guide pins 36 which are provided on the sides of the holder 18 and are movable in the directions $Z_1$ and $Z_2$, so as to raise the holder 18 in the direction $Z_1$. As the holder 18 rises, the magnetic heads 27 and 29 separate from the magnetic disc 12 and move out of the way from the windows 15 and 16 in the cartridge body 13. When the holder 18 reaches the raised position $H_1$, a gap 37 is formed between the magnetic head 27 and the shutter 14 and a gap 38 is formed between the magnetic head 29 and the shutter 14 as shown in FIG. 13. The gaps 37 and 38 respectively have sufficient lengths $g_1$ and $g_2$ such that there is no possibility of the shutter 14 hitting and damaging the magnetic heads 27 and 29.

When the slider 20 slides such a distance in the direction $Y_1$ that the holder 18 rises to the raised position $H_1$, the edge 20b of the hole 20a recedes from the position confronting the second bent portion 30b of the lever 30. As a result, the lever 30 rotates counterclockwise by the action of the spring 32, and the pushing mechanism operates to push the cartridge 11 slightly out of the holder 18.

As shown in FIG. 3, the first bent portion 30a of the lever 30 pushes the cartridge 11 in the direction $Y_2$ by the counterclockwise rotation of the lever 30. The cartridge 11 is pushed in the cartridge ejecting direction $Y_2$ until the pin 25 disengages from the cutout 40 of the cartridge body 13.

As the pin 25 escapes from the cutout 40 and reaches the edge of the side surface 40a, the pin 25 is pushed out of the cutout 40 by the shutter 14 and makes contact with a front edge 41 of the cartridge body 13. The temporary locking described before is cancelled when the pin 25 disengages from the cutout 40, and the shutter lever 21 rotates counterclockwise as shown in FIG. 4. The cartridge 11 is ejected out of the holder 18 and the shutter 14 moves in the direction $X_2$ to close the windows 15 and 16. The movement of the shutter 14 in the closing direction $X_2$ helps the counterclockwise rotation of the shutter lever 21.

By the counterclockwise rotation of the lever 30, a third bent portion 30c of the lever 30 moves to a position where an edge of an opening 21a in the shutter lever 21 cannot be engaged. Consequently, the lever 30 rotates to the position shown in FIG. 4.

The holder 18 and the slider 20 are engaged to each other and the height position of the holder 18 accurately corresponds to the sliding position of the slider 20. Hence, it is possible to minimize the inconsistencies in the raised position $H_1$ of the holder 18 when the shutter 14 closes among the recording and/or reproducing apparatuses.

For this reason, in each recording and/or reproducing apparatus, the shutter 14 always closes in a state where there are sufficient gaps formed between the shutter 14 and the magnetic heads 27 and 29. It is thus possible to positively prevent damage to the magnetic heads 27 and 29 when the shutter 14 closes.

The shape of the pin 25 is not limited to a cylindrical shape, and may have other shapes such as a triangular prism shape or a trapezoidal prism shape in accordance with the shape of the cutout 40 in the cartridge body 13. Furthermore, a roller may be used in place of the pin 25.

According to the present embodiment, the following advantageous features are obtainable.

Firstly, the shutter opening mechanism maintains the shutter open in the state where no force acts on the cartridge in the cartridge ejecting direction. Hence, when the cartridge is inserted into the innermost part of the holder, the inserted cartridge is held at this innermost part. For this reason, there is no need for the user to hold the rear end of the cartridge as the cartridge is lowered to the loaded position, and the cartridge loading operation can be carried out smoothly.

Secondly, no force acts on the cartridge in the cartridge ejecting direction even when the cartridge is in the loaded position. It is thus possible to maintain a high cartridge positioning accuracy when the cartridge is in the loaded position.

Thirdly, during the cartridge unloading operation, the pushing mechanism operates after the sufficient gaps are formed between the shutter and the magnetic heads, and the cartridge is pushed in the cartridge ejecting direction to a position where the temporary locking of the shutter opening mechanism is cancelled. Therefore, the shutter always closes without hitting or scratching the magnetic heads, and the unwanted damage to the magnetic heads during the closing of the shutter is positively prevented.

Figure 14:
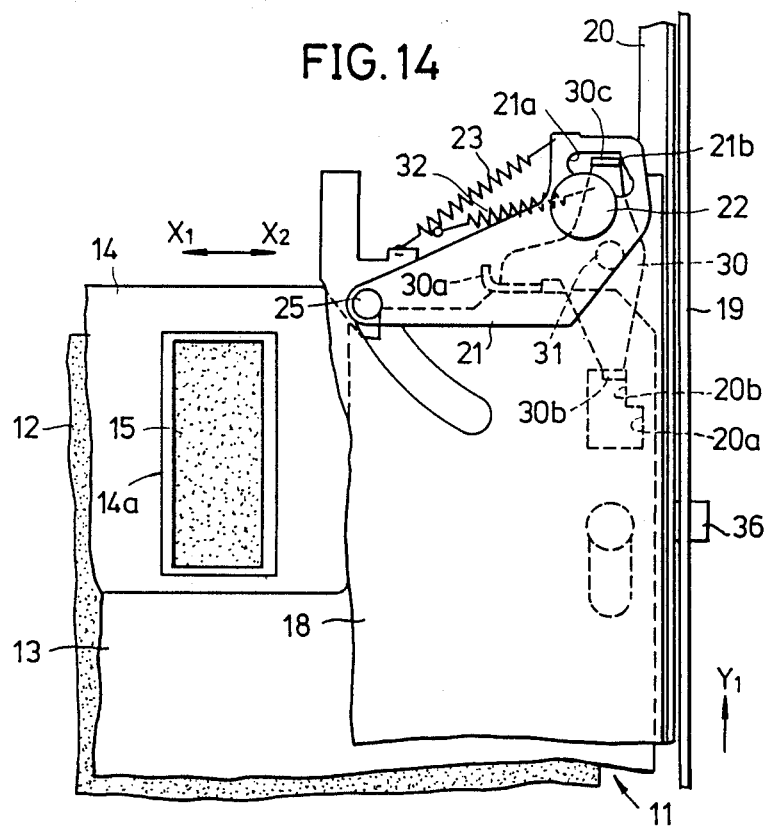
FIG. 14 is a plan view showing an essential part of a second embodiment of the magnetic disc cartridge loading and unloading mechanism according to the present invention on an enlarged scale in a state before the cartridge unloading operation is started.

Next, a description will be given on an essential part of a second embodiment of the magnetic disc cartridge loading and unloading mechanism according to the present invention, by referring especially to FIGS. 14 and 15. In FIGS. 14 and 15, those parts which are the same as those corresponding parts in FIGS. 1 through 4 are designated by the same reference numerals, and a description thereof will be omitted. Furthermore, those parts which are the same as those corresponding parts of the first embodiment will be described with reference to the drawings used in describing the first embodiment.

The third bent portion 30c of the lever 30 is fitted within the opening 21a in the shutter lever 21. A lock mechanism is constituted by the lever 30, the edge 20b of the hole 20a in the slider 20 for receiving the second bent portion 30b of the lever 30 and for restricting the clockwise rotation of the lever 30, and the third bent portion 30c of the lever 30.

In the state where the cartridge 11 is in the loaded position, an end portion 21b of the opening 21a in the shutter lever 21 is engaged and locked by the third bent portion 30c of the lever 30, as shown in FIG. 14.

When the slider 20 slides in the direction $Y_1$, the sloping grooves 35 guide the pins 36 provided on the sides of the holder 18 so as to raise the holder 18 in the direction $Z_1$. As the holder 18 rises, the magnetic heads 27 and 29 separate from the magnetic disc 12 and move out of the way from the windows 15 and 16 in the cartridge body 13. When the holder 18 reaches the raised position $H_1$, the gap 37 is formed between the magnetic head 27 and the shutter 14 and the gap 38 is formed between the magnetic head 29 and the shutter 14 as shown in FIG. 13 described before. The gaps 37 and 38 respectively have the sufficient lengths $g_1$ and $g_2$ such that there is no possibility of the shutter 14 hitting and damaging the magnetic heads 27 and 29.

When the slider 20 slides such a distance in the direction $Y_1$ that the holder 18 rises to the raised position $H_1$, the edge 20b of the hole 20a recedes from the position confronting the second bent portion 30b of he lever 30. As a result, the lever 30 rotates counterclockwise by the action of the spring 32, and the third bent portion 30c moves to a position where the end portion 21b of the shutter lever 21 cannot be engaged. Hence, the locking with respect to the shutter lever 21 is cancelled and the shutter lever 21 rotates counterclockwise as shown in FIG. 15. The cartridge 11 is thus ejected out of the holder 18 in the direction $Y_2$ and the shutter 14 moves in the direction $X_2$ to close the windows 15 and 16.

The holder 18 and the slider 20 are engaged to each other and the height position of the holder 18 accurately corresponds to the sliding position of the slider 20. Hence, it is possible to minimize the inconsistencies in the raised position $H_1$ of the holder 18 when the shutter 14 closes among the recording and/or reproducing apparatuses.

For this reason, in each recording and/or reproducing apparatus, the shutter 14 always closes in a state where there are sufficient gaps formed between the shutter 14 and the magnetic heads 27 and 29. It is thus possible to positively prevent damage to the magnetic heads 27 and 29 when the shutter 14 closes.

Figure 16:
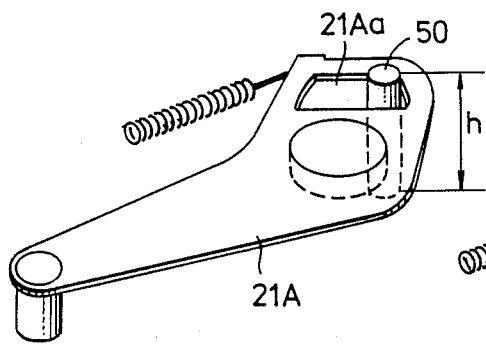
FIGS. 16 and 17 respectively show an essential part of a modification of the second embodiment in a locking state and a lock cancelling state of a lock mechanism.
Figure 17:
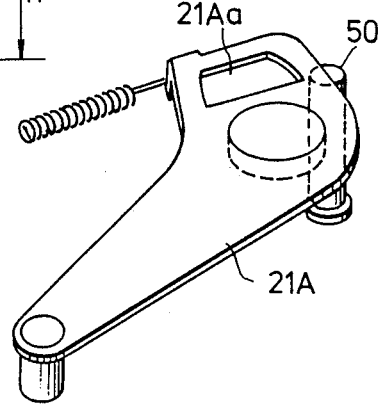

FIGS. 16 and 17 show an essential part of a modification of the second embodiment. In the present modification, the lock mechanism is constituted by a lock pin 50 located on the chassis (not shown). The lock pin 50 penetrates an opening 21Aa in a shutter lever 21A and locks the shutter lever 21A as shown in FIG. 16 when the holder 18 is at a height position lower than the raised position $H_1$ described before. A length h of the pin 50 is set so that the pin 50 relatively slips out of the opening 21Aa when the holder 18 rises to the raised position $H_1$.

Accordingly, the shutter lever 21A is locked until the holder 18 reaches the raised position $H_1$, and the locking with respect to the shutter lever 21A is cancelled as shown in FIG. 17 when the holder 18 reaches the raised position $H_1$. Therefore, as in the case of the second embodiment, it is possible to positively prevent damage to the magnetic heads during the closing of the shutter.

According to the second embodiment and the modification thereof, the shutter opening mechanism which opens the shutter of the cartridge during the cartridge loading operation remains locked to this shutter opening position by the lock mechanism until the holder moves to the raised position and the sufficient gaps are formed between the shutter and magnetic head during the cartridge unloading operation. There is absolutely no possibility of the shutter hitting the magnetic heads during the cartridge unloading operation.

Further, the present invention is not limited to these embodiments, but various variations and modifications may be made without departing from the scope of the invention.

What is claimed is:

1. A magnetic disc cartridge loading and unloading mechanism comprising:
   a holder for holding a magnetic disc cartridge which is inserted in an inserting direction, said magnetic disc cartridge comprising a cartridge body, a magnetic disc accommodated within the cartridge body and a shutter, said cartridge body having a cutout formed on a front end thereof and windows through which the magnetic disc may be exposed to outside, said windows being normally closed by the shutter;
   a holder moving mechanism for moving said holder together with said magnetic disc cartridge between a loaded position and an inserting/ejecting position in a direction approximately perpendicular to a plane on which said magnetic disc cartridge is inserted into said holder;
   a shutter opening mechanism provided on said holder for opening the shutter of said magnetic disc cartridge which is inserted into said holder without applying a force on said magnetic disc cartridge in an ejecting direction opposite to said inserting direction, said shutter opening mechanism comprising a first lever rotatably provided on said holder, first urging means for urging the first lever to rotate in a first rotational direction and first and second engaging means provided on the first lever, said first lever being engaged with and rotated in a second rotational direction opposite to said first rotational direction by said magnetic disc cartridge which is inserted into said holder so that said first engaging means pushes and opens the shutter, said first engaging means engaging the cutout of the cartridge body when the shutter is open, said first lever being urged by said first urging means so that said first engaging means pushes said magnetic disc cartridge at the cutout in a direction different from said ejecting direction when said magnetic disc cartridge is in said loaded position; and a pushing mechanism for pushing said magnetic disc cartridge in said ejecting direction to a position where the first engaging means disengages from the cutout, said pushing mechanism comprising a second lever which is rotatable between first and second rotational positions, second urging means for urging said second lever to rotate in a predetermined rotational direction from said first rotational position to said second rotational position, said second lever having a pushing portion for pushing said magnetic disc cartridge in said ejecting direction when said second lever rotates from said first rotational position to said second rotational position, an engaging portion for engaging said holder moving mechanism so that said second lever remains in said first rotational position while said holder moving mechanism moves said holder and said magnetic disc cartridge from said loaded position to said inserting/ejecting position, said second lever rotating from said first rotational position to said second rotational position when said holder and said magnetic disc cartridge are in said inserting/ejecting position, and a locking portion for engaging said second engaging means of said first lever to restrain said first lever from rotating in said fist rotational direction while said holder moving mechanism moves said holder and said magnetic disc cartridge from said loaded position to said inserting/ejecting position, said locking portion disengaging from said second engaging means of said first lever so that said first lever rotates in said first rotational direction, thereby allowing the shutter of said magnetic disc cartridge to close said windows when said holder and said magnetic disc cartridge are in said inserting/ejecting position.

2. A magnetic disc cartridge loading and unloading mechanism as claimed in claim 1 in which said locking portion of said second lever engages said second engaging means of said first lever so that said first lever maintains the shutter of said magnetic disc cartridge in an open state when said magnetic disc cartridte is at a position other than said inserting/ejecting position.

3. A magnetic disc cartridge loading and unloading mechanism as claimed in claim 1 in which said second engaging means comprises a hole provided in said first lever, and said locking portion of said second lever comprises a member for fitting into said hole provided in said first lever.

4. A magnetic disc cartridge loading and unloading mechanism as claimed in claim 3 in which said member is a bent portion formed on said second lever.

5. A magnetic disc cartridge loading and unloading mechanism as claimed in claim 1 in which said holder moving mechanism comprises a slider having sloping grooves and third urging means for urging the slider in said ejecting direction, said sloping grooves guiding corresponding pins which are provided on sides of said holder and are movable in the direction approximately perpendicular to the plane which said magnetic disc cartridge is inserted into said holder so as to move said holder.

6. A magnetic disc cartridge loading and unloading mechanism as claimed in claim 5 which further comprises an eject button, said eject button being connected to the slider, said slider moving in said inserting direction when said eject button is pushed in a state where said magnetic disc cartridge is in said loaded position so that said holder is moved to said inserting/ejecting position together with said magnetic disc cartridge.

7. A magnetic disc cartridge loading and unloading mechanism as claimed in claim 1 which is applied to a magnetic disc recording and/or reproducing apparatus having magnetic heads for recording and/or reproducing signals on and/or from the magnetic disc through the windows in the cartridge body, said magnetic heads being separated by predetermined distances from the shutter when said magnetic disc cartridge is in said inserting/ejecting position.

* * * * *